(12) United States Patent
Aoshima et al.

(10) Patent No.: US 6,400,055 B1
(45) Date of Patent: *Jun. 4, 2002

(54) MOTOR

(75) Inventors: Chikara Aoshima, Zama; Hiroaki Maegawa, Machida, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/293,063

(22) Filed: Apr. 16, 1999

(30) Foreign Application Priority Data

Apr. 20, 1998 (JP) .......................... 10-125313
Apr. 20, 1998 (JP) .......................... 10-125314

(51) Int. Cl.[7] ............................... H02K 21/12
(52) U.S. Cl. ............................... 310/156.01
(58) Field of Search ................ 310/156, 257, 310/49 R, 162, 163, 152, 268, 156.01, 156.08

(56) References Cited

U.S. PATENT DOCUMENTS

| | | | | |
|---|---|---|---|---|
| 3,149,256 A | | 9/1964 | Kohlhagen ................ 310/156 |
| 3,330,975 A | | 7/1967 | Osterwalder ............... 310/164 |
| 4,004,168 A | * | 1/1977 | Haydon ..................... 310/41 |
| 4,012,652 A | * | 3/1977 | Gilbert ..................... 310/162 |
| 4,207,483 A | * | 6/1980 | Baer ........................ 310/49 R |
| 4,296,341 A | * | 10/1981 | Guttinger .................. 310/41 |
| 4,355,252 A | * | 10/1982 | Lechner et al. ............ 310/162 |
| 4,634,907 A | * | 1/1987 | Lechner .................... 310/49 R |
| 4,686,398 A | * | 8/1987 | Lechner .................... 310/41 |
| 4,823,038 A | * | 4/1989 | Mizutani et al. ........... 310/257 |
| 4,973,866 A | * | 11/1990 | Wang ........................ 310/49 R |
| 4,987,329 A | * | 1/1991 | Schmidt et al. ............ 310/156 |
| 5,097,162 A | * | 3/1992 | Wang ........................ 310/49 R |
| 5,384,506 A | | 1/1995 | Aoshima .................... 310/49 R |
| 5,523,634 A | * | 6/1996 | Takahashi et al. .......... 310/49 A |
| 5,831,356 A | | 11/1998 | Aoshima .................... 310/49 R |
| 5,925,945 A | | 7/1999 | Aoshima .................... 310/49 R |

FOREIGN PATENT DOCUMENTS

| | | | |
|---|---|---|---|
| EP | 0 801 459 A1 | 10/1997 | |
| FR | 2214990 | 8/1974 | |
| GB | 2 067 024 A | 7/1981 | |
| JP | 409289767 | * 11/1997 | .......... H02K/37/14 |
| JP | 10225088 | * 8/1998 | |

OTHER PUBLICATIONS

U.S. application No. 08/994,994, filed Dec. 19, 1997.
U.S. application No. 09/022,474, filed Feb. 12, 1998.

* cited by examiner

Primary Examiner—Joseph Waks
(74) Attorney, Agent, or Firm—Fitzpatrick, Cella, Harper & Scinto

(57) ABSTRACT

A motor provided with a rotor magnet circumferentially divided into n section which are alternately magnetized to different poles, a coil disposed axially of the rotor magnet, outer magnetic poles and inner magnetic poles excited by the coil being opposed to the outer peripheral surface and inner peripheral surface, respectively, of the rotor, and a holder for holding the rotor magnet at a position at which the centers of the poles of the magnet deviate from a line linking the centers of the outer magnetic poles and the center of rotation of the magnet together when the outer magnetic poles and the inner magnetic poles are not excited, whereby the motor is made into a one-phase motor to thereby stabilize the initial positioning of the rotor and also, the motor is made high in output and super-compact.

10 Claims, 13 Drawing Sheets

MOTOR

BACKGROUND OF THE INVENTION

1. Field of the Invention

This invention relates to a motor constructed super-compactly.

2. Related Background Art

Heretofore, as a motor formed as a compact motor, there is, for example, a compact cylindrically shaped step motor as shown in FIG. 24 of the accompanying drawings.

In FIG. 24, this motor is provided with two stators 102 arranged axially of the motor, and each of the stators 102 has two stator yokes 106 disposed so as to be axially opposed to each other. In each stator 102, a stator coil 105 is concentrically wound on a bobbin 101 held by the two stator yokes 106. Each bobbin 101 having the stator coil 105 wound thereon is axially sandwiched and fixed by and between the two stator yokes 106. Each of the stator yokes 106, 106 is formed with stator teeth 106a and 106b alternately disposed circumferentially of the inner diametral surface of the bobbin 101. On the other hand, the pair of stator yokes 106 and 106 having the stator teeth 106a and 106b are fixed to the case 103 of each stator 102. Thus, the stators 102 are constructed.

A flange 115 and a bearing 108 are fixed to one (the left one as viewed in FIG. 24) of the two sets of case 103, and a bearing 108 on the opposite side is fixed to the other (the right one as viewed in FIG. 24) case 103. A rotor 109 is of such a structure that a rotor magnet 111 is fixed to a rotor shaft 110. An air gap is formed between the outer peripheral surface of the rotor magnet 111 and the inner diametral surface of the stator yoke 106 of the stator 102. The rotor shaft 110 is rotatably supported by the two bearings 108 fixed to each case 103.

FIG. 26 of the accompanying drawings is a plan view exemplifying a step motor driven by a coil which is used in a timepiece or the like. In FIG. 26, reference numeral 201 designates a rotor comprising a permanent magnet, reference numerals 202 and 203 denote stators, and reference numeral 204 designates a coil.

However, in the prior art compact step motor shown in FIG. 24, the case 103, the bobbin 101, the stator coil 105 and the stator yoke 106 are concentrically disposed around the rotor, and this leads to the inconvenience that the outside dimension of the motor becomes large. Also, a magnetic flux created by the electrical energization of the stator coils 105 passes chiefly through the end surface $106a_1$ of the stator tooth 106a and the end surface $106b_1$ of the stator tooth 106b, as shown in FIG. 25 of the accompanying drawings and therefore does not effectively act on the rotor magnet 111, and there is the problem left to be solved that the output of the motor does not become high. Also, in the motor shown in FIG. 26, there is the problem left to be solved that a magnetic flux created by the electrical energization of the coil 204 concentrates in the portion of a small gap between the rotor 201 and the stator 202 and does not effectively act on the magnet 201.

The applicant of the basic application in Japan has proposed as U.S. Pat. No. 5,831,356 a motor which has solved such problems.

This proposed motor is designed such that a rotor comprising a permanent magnet circumferentially equidistantly divided and alternately magnetized to different poles is formed into a cylindrical shape, a first coil, the rotor and a second coil are disposed axially of the rotor in the named order, a first outer magnetic pole and a first inner magnetic pole excited by the first coil are opposed to the outer peripheral surface and inner peripheral surface, respectively, of the rotor, and a second outer magnetic pole and a second inner magnetic pole excited by the second coil are opposed to the outer peripheral surface and inner peripheral surface, respectively, of the rotor, and a rotary shaft, which is a rotor shaft, is taken out of the cylindrically shaped permanent magnet.

The motor of such a construction is high in output and can have its outside dimension made small, but the working of its magnetic pole teeth is difficult because the diametral dimension of its inner magnetic poles is small, and it has been desired that a stable output free of fluctuation be obtained from a motor of a small diametral dimension.

Therefore, the applicant of the basic application filed in Japan has recently proposed a motor in which the shape of inner magnetic poles is made readily workable as U.S. patent application Ser. No. 08/994,994, and a rotor, in which output transmitting means, such as gears and pulleys, are easily mounted on a rotary shaft of small diametral dimension to thereby obtain a stable output free of fluctuation, has been proposed as U.S. patent application Ser. No. 09/022,474.

Recently, it has been desired that a motor having a high output and which can be constructed super-compactly be obtained.

SUMMARY OF THE INVENTION

The present invention has been made in view of the above-noted circumstances and an object thereof is to provide a motor which is high in output and is constructed more super-compactly.

Another object of the present invention is to stabilize the positioning of a rotor when a motor is made into a one-phase motor.

Further objects of the present invention will become apparent from the following description of some specific embodiments of the invention.

DESCRIPTION OF THE PREFERRED EMBODIMENTS

Some embodiments of the present invention will hereinafter be described with reference to the drawings.

Figure 1:
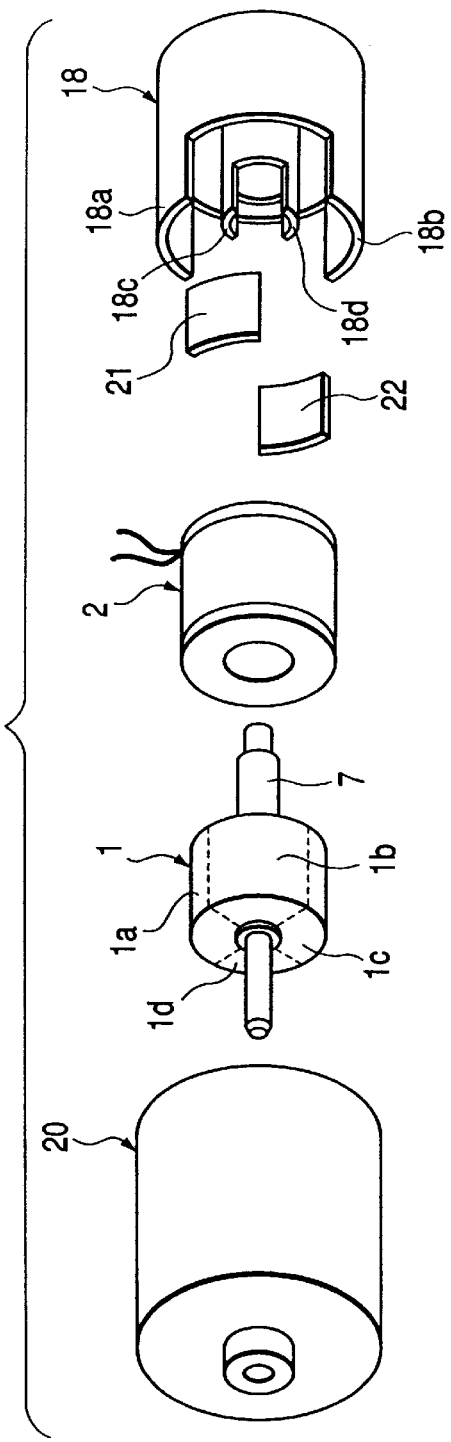
FIG. 1 is an exploded perspective view of a motor according to Embodiment 1 of the present invention.

Before Embodiment 1 of the present invention is described, the basic construction of a step motor according to the present invention will first be described with reference to FIGS. 1 and 2. FIG. 1 is an exploded perspective view of the step motor, and FIG. 2 is a cross-sectional view of the motor shown in FIG. 1 during the assembly thereof.

Figure 2:
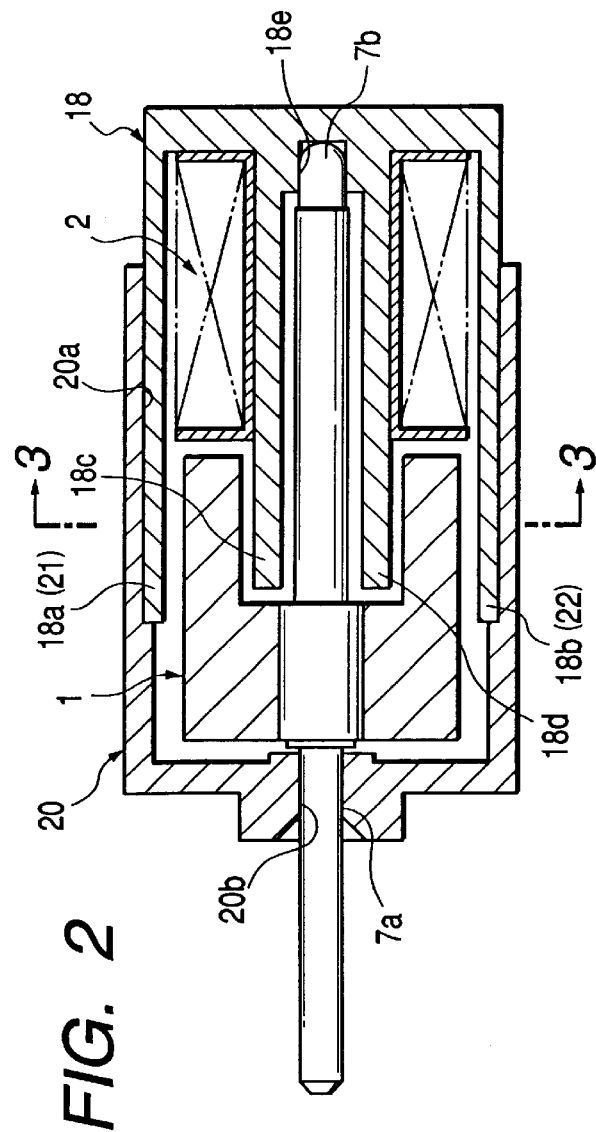
FIG. 2 is a cross-sectional view of the motor shown in FIG. 1 during the assembly thereof.

In FIGS. 1 and 2, the motor according to the present invention is provided with a rotatable rotor magnet 1 circumferentially alternately magnetized to different poles, a cylindrical stator 18 opposed to the rotor magnet 1 with a clearance therebetween, and a coil 2 mounted in the interior of the stator 18, the coil 2 is disposed axially of the rotor magnet 1, the outer magnetic poles 18a and 18b of the stator 18 excited by the coil 2 are opposed to the outer peripheral surface of the magnet 1, the inner magnetic poles 18c and 18d of the stator 18 are opposed to the inner peripheral surface of the magnet 1, and provision is made of holding means for holding the magnet at a location whereat the center of the poles of the magnet deviates from a straight line linking the center of the outer magnetic poles and the center of rotation of the magnet together. In the ensuing description, the present invention will be described with respect to a case where the motor is a step motor.

In FIGS. 1 and 2, the magnet (rotor magnet) 1 constituting a rotor has its outer peripheral surface circumferentially divided into a plurality of portions (in the present embodiment, four portions) and alternately magnetized to S poles and N poles. Of the magnetized portions 1a, 1b, 1c and 1d, the magnetized portions 1a and 1c are magnetized to S poles and the magnetized portions 1b and 1d are magnetized to N poles. The centers of the poles of the magnetized portions 1a, 1b, 1c and 1d are shown as $K_1$, $K_2$, $K_3$ and $K_4$ in FIG. 3. Also, the magnet 1 is made of a plastic magnet material formed by injection molding. By the magnetic 1 being thus made of a plastic magnet material, the thickness thereof with respect to the radial direction of the cylindrical shape of the rotor magnet 1 can be made very small.

The central portion of the rotor magnet 1 is formed with an axial through-hole, and a fitting portion 1e having its inner diameter made small is formed on the axially intermediate portion of this through-hole. An output shaft 7, which is a rotor shaft, is forced into the fitting portion 1e of the rotor magnet 1 and is secured to the magnet 1. The magnet 1 comprises a plastic magnet molded by injection molding and therefore, it is not broken even by an assembling method such as forcing the rotor shaft 7 into the fitting portion. Also, even though the magnet 1 is of a complicated shape having the fitting portion 1e of a small inner diameter in the axially central portion of the through-hole thereof, it can be manufactured easily. Also, the output shaft 7 and the magnet 1 are assembled together and secured by being forced in and therefore, the assembly becomes easy and it becomes possible to manufacture the motor inexpensively. The rotor (magnet rotor) 1 is constituted by the output shaft 7 and the magnet 1.

As the material of the magnet 1, use is made of a plastic magnet formed by injection-molding a mixture, for example, of Nd—Fe—B rare earth magnetic powder and a thermoplastic resin binder material such as polyamide. Thus, the bending strength of a compression-molded magnet is of the order of 500 kgf/cm$^2$, whereas when for example, polyamide resin is used as the binder material, bending strength of 800 kgf/cm$^2$ or greater can be obtained and accordingly, such a thin-walled cylindrical shape that cannot be realized by compression molding can be provided. As will be described later, it enhances the performance of the motor to make the magnet into a thin-walled cylindrical shape. Also, by using the aforedescribed plastic magnet, the shape of the magnet can be freely chosen and an effect which cannot be provided by compression molding, that is, integrating the shape for securing the rotor shaft 7, can be realized, and sufficient rotor shaft securing strength can be obtained. Also, the magnet is excellent in strength and therefore, the rotor shaft 7 will not be damaged (broken) even if use is made of a method of forcing in the rotor shaft 7.

At the same time, the secured portion of the rotor shaft 7 is integrally molded, whereby the coaxial accuracy of the magnet portion to the rotor shaft portion is improved and it becomes possible to reduce vibration and it also becomes possible to reduce the clearance distance between the magnet 1 and the stator portion, and the sufficient output torque of the motor can be obtained although the magnetic characteristic of a compression-molded magnet is 8 MGOe or greater, whereas the magnetic characteristic of an injection-molded magnet is of the order of 5 to 7 MGOe. Also, the injection-molded magnet has a thin resin coating formed on its surface and therefore, as compared with the compression-molded magnet, the creation of rust is greatly decreased and a rust preventing process such as coating can be eliminated. Also, there is not the adherence of magnetic powder which poses a problem in a compression magnet, and there is not the swelling of the surface which is liable to occur during the rust preventing coating and thus, the quality can be improved.

In FIGS. 1 and 2, the cylindrically shaped coil 2 is disposed concentrically with and axially of the magnet 1. The outer diameter of the coil 2 is substantially equal to the outer diameter of the magnet 1. The stator 18 is formed of a soft magnetic material, and comprises an outer cylinder portion and an inner cylinder portion. The coil 2 is mounted between the outer cylinder portion and inner cylinder portion of the stator 18. By electrically energizing this coil 2, the stator 18 is excited. The fore end portion of the outer cylinder portion of the stator 18 forms outer magnetic poles 18a and 18b, and the fore end portion of the inner cylinder portion of the stator 18 forms inner magnetic poles 18c and 18d. The inner magnetic pole 18c and the inner magnetic pole 18d are formed with a deviation of 360/0.5 n degrees, i.e., 180 degrees when as in the present embodiment, the number of magnetic poles is four, so that they may be in phase with each other. The outer magnetic pole 18a is disposed in opposed relationship with the inner magnetic pole 18c, and the outer magnetic pole 18b is disposed in opposed relationship with the inner magnetic pole 18d.

The outer magnetic poles 18a and 18b of the stator 18 are formed by cut-away apertures and teeth extending out in a direction parallel to the shaft. By this construction, it becomes possible to form the magnetic poles while minimizing the diameter of the motor. That is, if the outer magnetic poles are formed by radially extending unevenness, the diameter of the motor will be correspondingly larger, but in the present embodiment, the outer magnetic poles are formed by cut-away apertures and teeth extending out in a direction parallel to the shaft and therefore, the diameter of the motor can be minimized.

The outer magnetic poles 18a, 18b and inner magnetic poles 18c, 18d of the stator 18 are provided in opposed relationship with the outer peripheral surface and inner peripheral surface of one end of the rotor magnet 1 and so as to sandwich one end of the rotor magnet 1 therebetween. Also, one end portion 7b of the output shaft 7 is rotatably fitted in the aperture 18e of the stator 18. Accordingly, a magnetic flux created by the coil 2 crosses the magnet 1, which is the rotor between the outer magnetic poles 18a, 18b and the inner magnetic poles 18c, 18d and therefore, effectively acts on the magnet which is the rotor, and enhances the output of the motor. Also, as previously described, the magnet 1 is formed of a plastic magnet material formed by injection molding, whereby the thickness of the cylindrical shape with respect to the radial direction thereof can be made very small. Therefore, the distance between the outer magnetic poles 18a, 18b and inner magnetic poles 18c, 18d of the stator 18 can be made very small, and the magnetic resistance of a magnetic circuit formed by the coil 2 and the first stator can be made small. Thereby, a great deal of magnetic flux can be created by a small electric current and thus, the increased output and lower power consumption of the motor and the downsizing of the coil are achieved.

The reference numeral 20 designates a cover as a cylindrical member formed of a non-magnetic material, and the outer diametral portion (the portion on which the outer magnetic poles 18a and 18b are formed) of the stator 18 is fitted and adhesively or otherwise fixed to the inner diametral portion 20a of this cover 20. The fitting portion 7a of the output shaft 7 is rotatably fitted in the fitting hole 20b of the cover 20, and one end portion 7b of the output shaft 7 is rotatably fitted in the fitting aperture 18e of the stator 18.

FIGS. 3 to 6 are illustrations successively showing the operation of the motor of FIG. 2 by the use of a cross-sectional view taken along the line 3—3 of FIG. 2. In FIGS. 3 to 6, $Q_1$ designates the center of the outer magnetic pole 18a of the stator 18, $Q_2$ denotes the center of the outer magnetic pole 18b of the stator 18, and $Q_3$ designate the center of rotation of the rotor magnet 1. The reference numerals 21 and 22 denote positioning stators formed of a soft magnetic material. These positioning stators 21 and 22 are secured to the inner diametral portion 20a (FIG. 2) of the cover 20.

Figure 3:
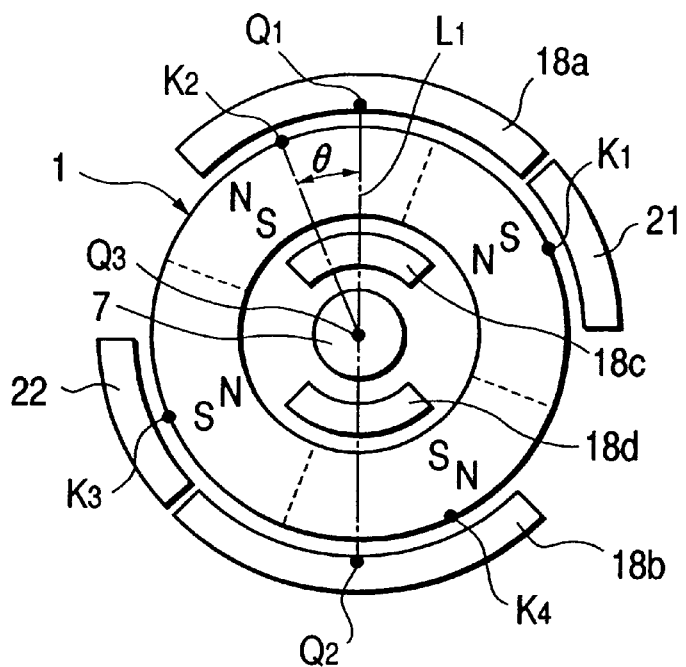
FIG. 3 shows the positional relation between the rotor and stator of the motor shown in FIG. 2, and shows the state of the rotor when a coil is not electrically energized.
Figure 4:
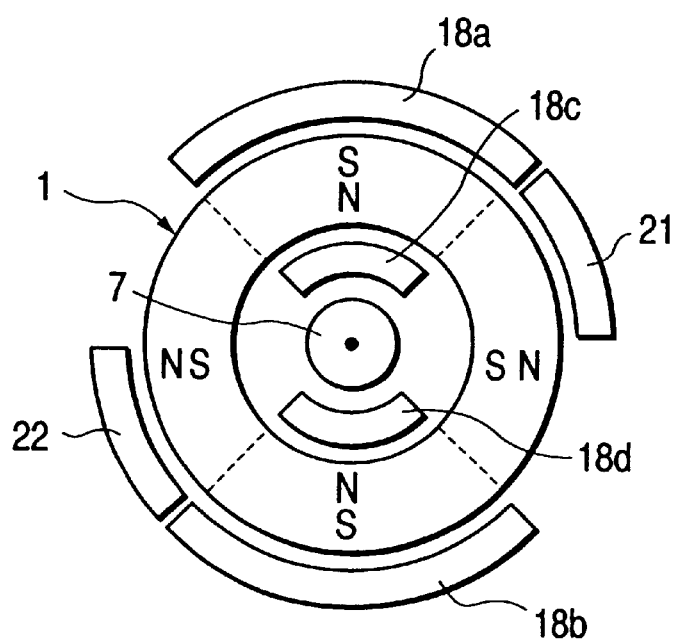
FIG. 4 shows the state of the rotor when the coil is electrically energized from the state of FIG. 3.
Figure 5:
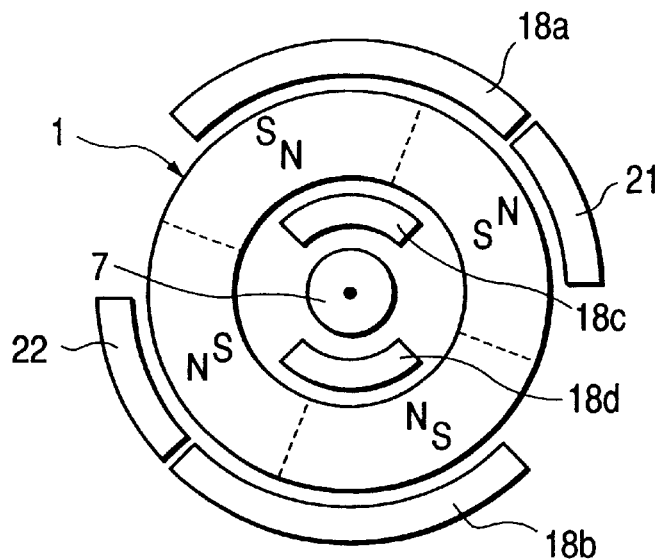
FIG. 5 shows the state of the rotor when the electrical energization of the coil has been cut off in the state of FIG. 4.

The positioning stators 21 and 22 are opposed to the outer peripheral surface of the rotor magnet 1. One positioning stator 21, as shown in FIG. 3, is located between the outer magnetic poles 18a and 18b of the stator 18 and near the outer magnetic pole 18a. The other positioning stator 22, as shown in FIG. 3, is located between the outer magnetic poles 18a and 18b of the stator 18 and near the outer magnetic pole 18b. These positioning stators 21 and 22 are not in contact with the stator 18 and are not opposed to the inner magnetic poles 18c and 18d or are sufficiently spaced apart from the inner magnetic poles 18c and 18d, whereby even if the coil 2 is electrically energized, they are hardly magnetized as compared with the outer magnetic poles 18a and 18b, and accordingly do not contribute to rotatively driving the rotor magnet 1.

By providing the positioning stators 21 and 22, the stopped position of the magnet when the coil 2 is not electrically energized is set to a position shown in FIG. 3. That is, the magnet 1 is set so as to be stopped at a position (a position shown in FIG. 3) in which the centers $K_1$, $K_2$, $K_3$ and $K_4$ of the poles of the magnetized portion of the magnet 1 deviate from a straight line $L_1$ linking the centers of the outer magnetic poles 18a and 18b of the stator 18 and the center of rotation of the magnet 1 together. Speaking regarding $K_2$, the magnet is stopped at a position deviating by an angle θ. When the coil 2 is electrically energized from this position, the positioning stators 21 and 22 are not excited as previously described, but the outer magnetic poles 18a, 18b and the inner magnetic poles 18c, 18d are excited, and the force with which the excited outer magnetic poles 18a, 18b act on the magnetized portion of the magnet 1 is directed in the direction of rotation of the magnet 1 without fail. Therefore, the magnet (rotor magnet) 1 is actuated smoothly.

Figure 22:
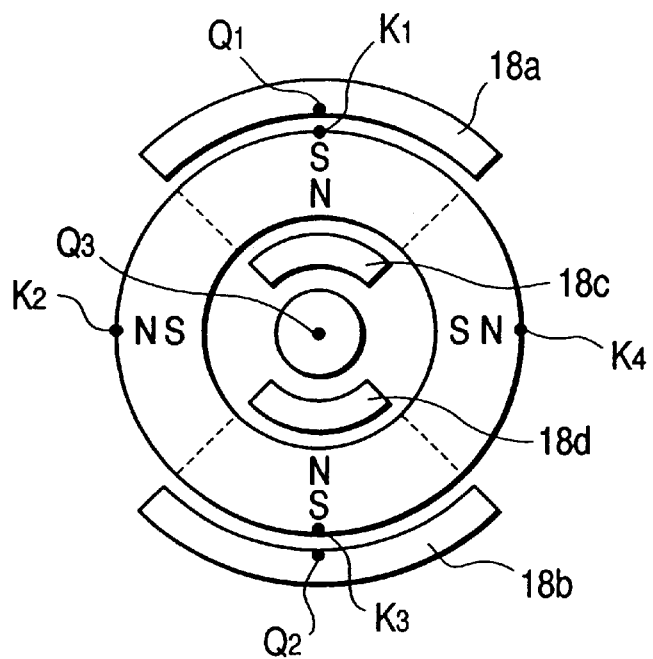
FIG. 22 shows the positional relation between the rotor and stator of a motor to which the countermeasure of the present invention is not taken, and shows a first stable state of the rotor when the coil is not electrically energized.
Figure 23:
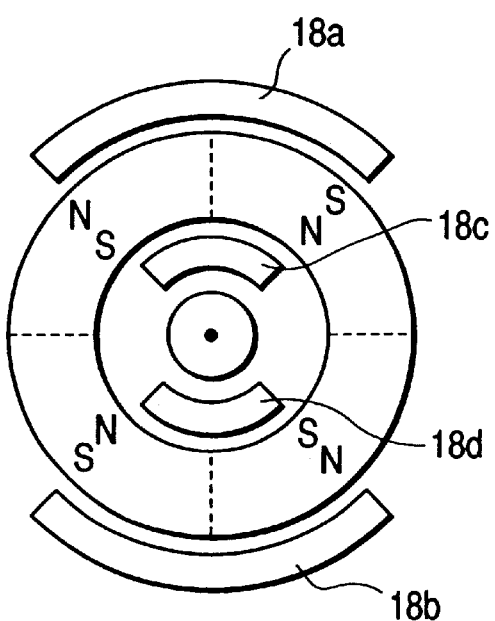
FIG. 23 shows a second stable state of the rotor when the coil is not electrically energized in FIG. 22.
Figure 24:
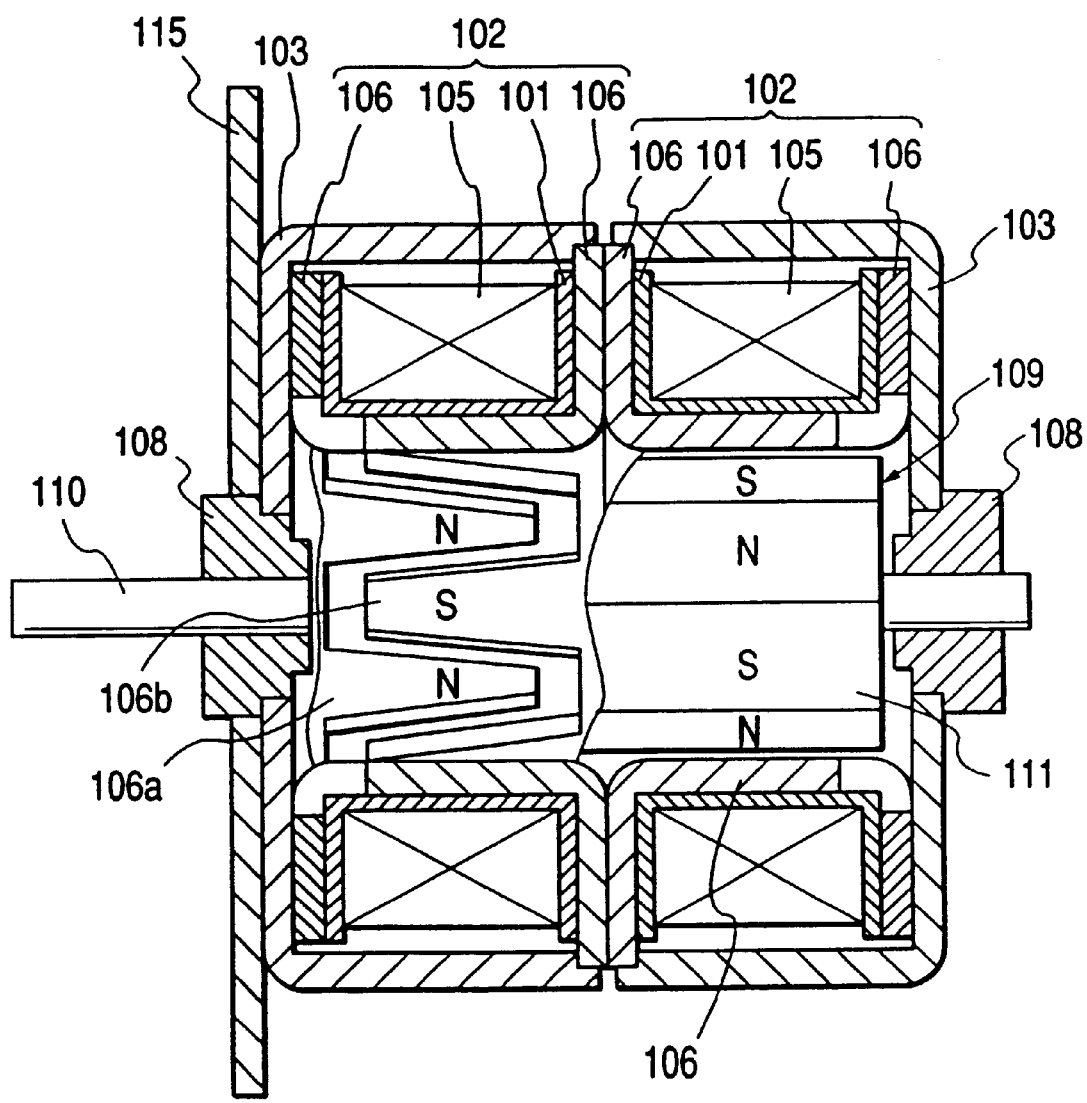
FIG. 24 is a cross-sectional view showing a step motor according to the prior art.
Figure 25:
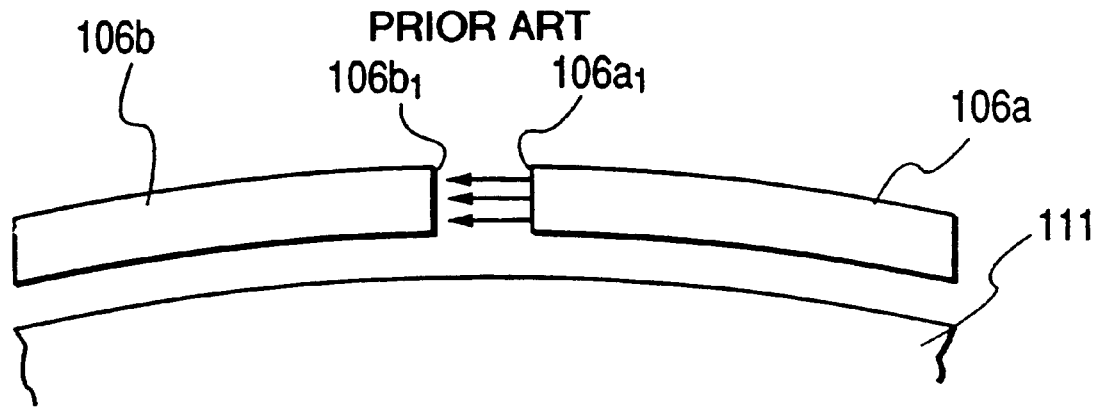
FIG. 25 is an illustration of the magnetic flux of the step motor according to the prior art shown in FIG. 24.
Figure 26:
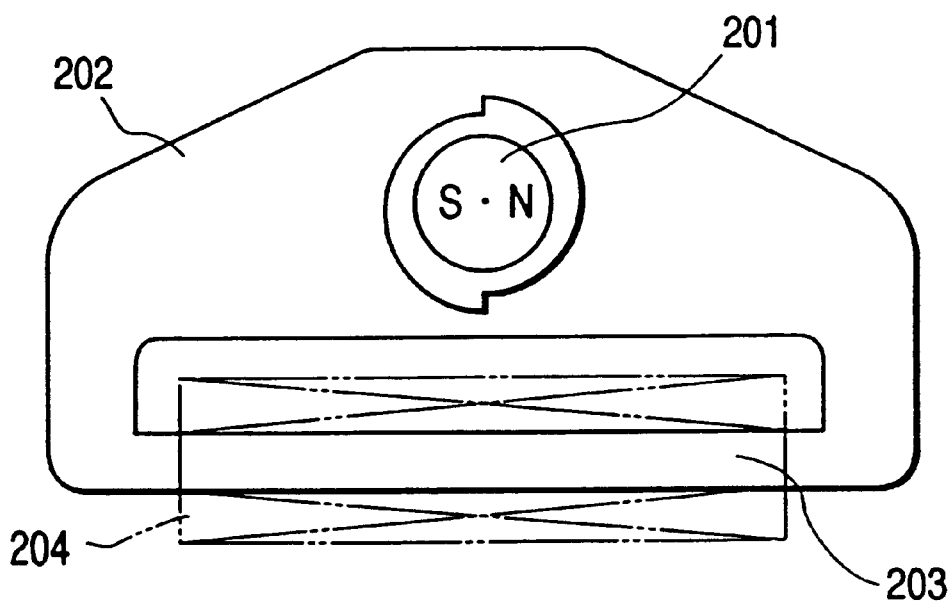
FIG. 26 is a plan view showing a one-phase motor according to the prior art.

In the case of a motor which does not have the positioning stators 21 and 22, the position at which the magnet 1 is stably stopped when the coil 2 is not electrically energized is that shown in FIG. 22 or 23. FIGS. 22 and 23 are typical cross-sectional views showing these two positions at which the magnet 1 is stably stopped. In the position of FIG. 22, the centers $K_1$, $K_2$, $K_3$ and $K_4$ of the poles of the magnetized portion of the magnet 1 are on a straight line linking the centers $Q_1$ and $Q_2$ of the outer magnetic poles and the center of rotation $Q_3$ of the magnet 1 together and therefore, even if the coil 2 is electrically energized, an electromagnetic force does not act in a direction to rotate the magnet 1.

In the position of FIG. 23, the actuation of the magnet 1 is made possible by the electrical energization of the coil 2, but unless the electrical energization is changed at a certain timing, the magnet 1 cannot be rotated in its stable state. That is, when from the state of FIG. 23, the outer magnetic poles 18a and 18b are excited, for example, into N poles, even if the electrical energization of the coil 2 is changed over to the opposite direction after the magnet 1 is stopped at the same position as that of FIG. 22, and the outer magnetic poles 18*a* and 18*b* are excited into S poles, the electromagnetic force does not act in the direction to rotate the magnet 1, as described in connection with FIG. 22. The positioning stators 21 and 21 cooperate with the rotor magnet 1 to constitute holding means for holding the magnet 1. Also, the positioning stators 21 and 22 are located between the outer magnetic poles 18*a* and 18*b* of the stator 18 and therefore, can be constructed without making the size of the motor larger.

The operation of the step motor according to the above-described Embodiment 1 of the present invention will now be described with reference to FIGS. 3 to 6. When from the state of FIG. 3, the coil 2 is electrically energized to thereby excite the outer magnetic poles and 18*a*, 18*b* of the stator 18 into N poles and excite the inner magnetic poles 18*c*, 18*d* of the stator 18 into S poles, the magnet 1, which is the rotor is rotated in a counter-clockwise direction as viewed in FIG. 3, and assumes a state shown in FIG. 4. Since the positioning stators 21 and 22 are hardly excited by the coil 2, the position of the magnet 1 is determined substantially by the excited state of the magnetized portion of the magnet 1 and the outer magnetic poles 18*a*, 18*b* and inner magnetic poles 18*c*, 18*d* of the stator 18 by the coil 2, and the magnet assumes the state shown in FIG. 4. When from this state, the coil 2 is electrically deenergized, a state stabilized by the magnetic force of the magnet 1 (the position of FIG. 5) is brought about.

Figure 6:
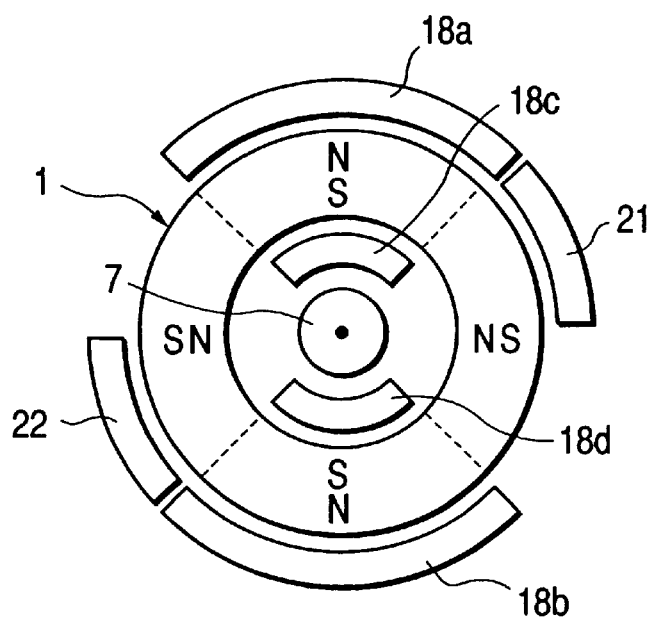
FIG. 6 shows the state of the rotor when the electrical energization of the coil has been reversed in the state of FIG. 5.

Next, when the electrical energization of the coil 2 is reversed to thereby excite the outer magnetic poles 18*a* and 18*b* of the stator 18 into S poles and the inner magnetic poles 18*c* and 18*d* of the stator 18 into N poles, the magnet 1, which is the rotor is further rotated in the counter-clockwise direction and assumes a state shown in FIG. 6. Thereafter, the direction of electrical energization of the coil 2 is sequentially changed over, whereby the magnet 1, which is the rotor is rotated to a position conforming to the phase of electrical energization. That is, the motor is rotated. When the electrical energization of the coil 2 is cut off from the state in which the motor is rotated, the motor is stopped at the position of FIG. 3 in which it is stabilized by the magnetic force of the rotor magnet 1.

According to Embodiment 1 described above, the diameter of the motor can be a sufficient size to oppose the magnetic poles of the stator 18 to the outer peripheral surface of the magnet 1, and the length of the motor can be the length of the magnet 1 plus the length of the coil 2. Thus, the size of the motor is determined by the diameters and lengths of the magnet 1 and the coil 2, and by making the diameters and lengths of the magnet 1 and the coil 2 very small, the motor can be made super-compact. That is, the diameter of the motor is substantially determined by the outer magnetic poles 18*a* and 18*b* opposed to the outer peripheral surface of the rotor magnet 1, and the axial length of the motor is determined by the coil 2 and the rotor magnet 1 being arranged (disposed) axially thereof, and the motor can be made very compact.

Also, a magnetic flux created by the coil 2 crosses the magnet between the outer magnetic poles and the inner magnetic poles and therefore acts effectively. Further, provision is made of the holding means constituted by the rotor magnet 1 and the positioning stators 21 and 22 opposed to the outer peripheral surface of the magnet 1 and therefore, during the non-energization of the coil 2, the magnet 1 can be held at a position at which the centers of the pole of the magnet 1, deviate from a straight line linking the centers of the outer magnetic poles and the center of rotation $Q_3$ of the magnet together. Accordingly, during the stoppage of the motor to the first electrical energization of the coil 2, the force with which the magnetic flux created by the coil 2 acts on the magnet 1 does not go toward the center of rotation of the magnet 1 and accordingly, it becomes possible to effect the smooth and stable actuation of the motor.

Also, the motor can be constituted by a very small number of parts such as the rotor magnet 1, the coil 2, the stator 18 and the output shaft 7 and thus, the cost can be reduced. Also, the rotor magnet 1 is formed into a hollow cylindrical shape, and the outer magnetic poles 18*a*, 18*b* and the inner magnetic poles 18*c*, 18*d* are opposed to the outer peripheral surface and inner peripheral surface, respectively, of this rotor magnet 1 formed into the hollow cylindrical shape, whereby an effective output can be obtained as the motor. The output shaft (rotor shaft) 7 is secured to the fitting portion 1*e* of the central hole of the magnet 1 which is the rotor by a press-in operation. Since the rotor magnet 1 comprises a plastic magnet formed by injection molding, the rotor magnet 1 is not broken even by assembly by a press-in operation, and also, even a complicated shape in which the fitting portion 1*e* of a small inner diameter is provided in the axially central portion can be manufactured easily. Also, the output shaft 7 and the magnet 1 are assembled and secured by a press-in operation and therefore, the assembly is easy and inexpensive manufacture becomes possible.

A description will now be provided of the fact that the step motor of the construction described above in Embodiment 1 is of a construction best suited for making the motor super-compact. That is, in the basic construction of the step motor, firstly, the rotor magnet 1 is made into a hollow cylindrical shape, secondly, the outer peripheral surface of the rotor magnet 1 is circumferentially divided into a plurality of sections and alternately magnetized to different poles, thirdly, the coil 2 is disposed axially of the rotor magnet 1, fourthly, the outer magnetic poles and inner magnetic poles of the stator 18 excited by the coil 2 are opposed to the outer peripheral surface and inner peripheral surface, respectively, of the rotor magnet 1, fifthly, the outer magnetic poles 18*a* and 18*b* are formed by cut-away apertures and teeth extending out in a direction parallel to the shaft, and sixthly, provision is made of holding means for holding the rotor magnet 1 at a position at which the centers of the poles of the rotor magnet 1 deviate from a straight line linking the centers of the outer magnetic poles 18*a*, 18*b* and the center of rotation $Q_3$ of the magnet 1 together when the coil 2 is not electrically energized.

The diameter of this step motor (motor) can be of a size sufficient to oppose the magnetic poles of the stator 18 to the diameter of the rotor magnet 1, and the length of this step motor can be the length of the rotor magnet 1 plus the length of the coil 2. Thus, the size of the step motor is determined by the diameters and lengths of the rotor magnet 1 and the coil 2, and if the diameters and lengths of the rotor magnet 1 and the coil 2 are made very small, the step motor can be made super-compact.

If at this time, the diameters and lengths of the rotor magnet 1 and the coil 2 are made very small, it will become difficult to maintain the accuracy as the step motor, but in the aforedescribed embodiment, the problem of the accuracy of the step motor is solved by a simple construction in which the rotor magnet 1 is formed into a hollow cylindrical shape and the outer magnetic poles and inner magnetic poles of the stator 18 are opposed to the outer peripheral surface and inner peripheral surface, respectively, of the rotor magnet 1 formed into the hollow cylindrical shape. If in that case, not only the outer peripheral surface of the rotor magnet 1, but also the inner peripheral surface of the rotor magnet 1 is circumferentially divided into a plurality of sections and magnetized, the output of the motor can be further enhanced. Also, provision is made of the holding means for holding the rotor magnet 1 at the deviated position and therefore, when the coil 2 is electrically energized (first electrical energization) from during the stoppage of the motor, the force with which the magnetic flux from the coil 2 acts on the magnet 1 does not go toward the center of rotation of the magnet 1 and therefore, the smooth and stable actuation of the motor can be effected.

Also, the rotor magnet 1 is formed of a plastic magnet material formed by injection molding, as previously described, whereby the thickness thereof with respect to the radial direction of the cylindrical shape can be made very small. Therefore, the distance between the outer magnetic poles 18a, 18b and inner magnetic poles 18c, 18d of the stator 18 can be made very small, and the magnetic resistance of a magnetic circuit formed by the coil 2 and the stator 18 can be made small. Thereby, a great deal of magnetic flux can be created by a small electric current, and it becomes possible to achieve the increased output and lower power consumption of the motor and the downsizing of the coil.

Embodiment 2 of the present invention will now be described with reference to FIGS. 7 to 12, and the same portions of Embodiment 2 as those of Embodiment 1 are given the same reference characters and need not be described specifically.

Figure 7:
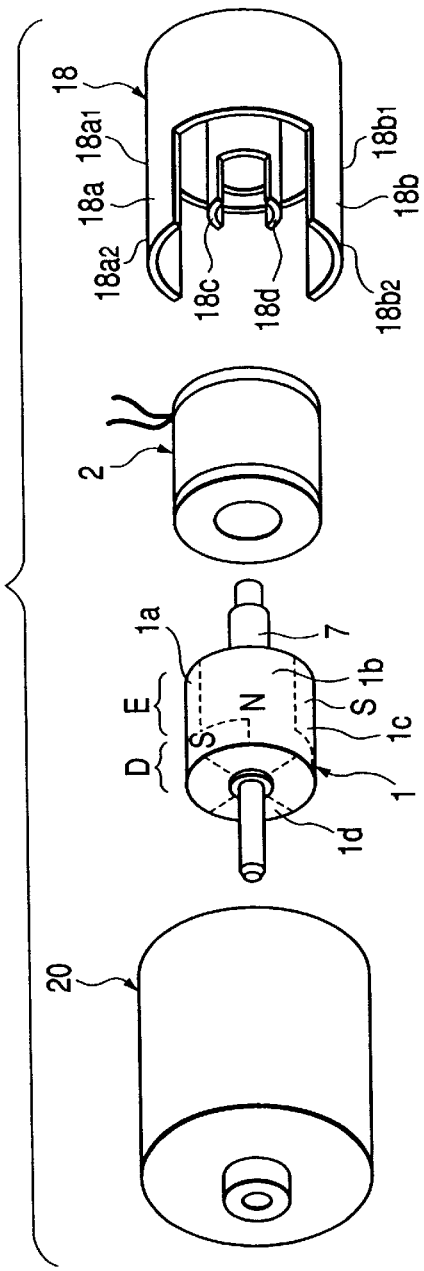
FIG. 7 is an exploded perspective view of a motor according to Embodiment 2 of the present invention.
Figure 8:
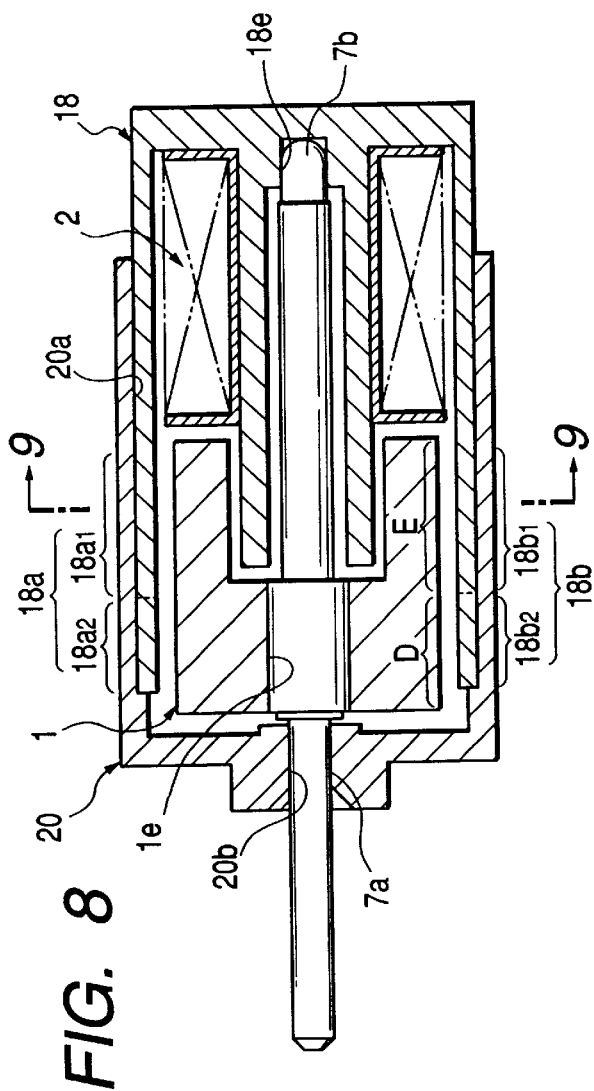
FIG. 8 is a cross-sectional view of the motor shown in FIG. 7 during the assembly thereof.

FIG. 7 is an exploded perspective view of a motor according to Embodiment 2 of the present invention, FIG. 8 is a cross-sectional view of the motor shown in FIG. 7 during the assembly thereof, and FIGS. 9 to 12 are illustrations sequentially showing the operation of the motor of FIGS. 7 and 8 by the use of a cross-sectional view taken along the line 9—9 of FIG. 8. This embodiment 2 also shows a case where the motor is a step motor. In this embodiment 2, holding means is constructed by further extending the outer magnetic poles 18a and 18b of the stator 18. The outer magnetic poles 18a and 18b comprise portions $18a_1$ and $18b_1$ opposed to the inner magnetic poles 18c and 18d, and extended portions $18a_2$ and $18b_2$. These extended portions $18a_2$ and $18b_2$ are not opposed to the inner magnetic poles 18c and 18d and therefore, even if the coil 2 is electrically energized, they are hardly magnetized as compared with the opposed portions $18a_1$ and $18b_1$, and accordingly do not produce a driving force.

Figure 9:
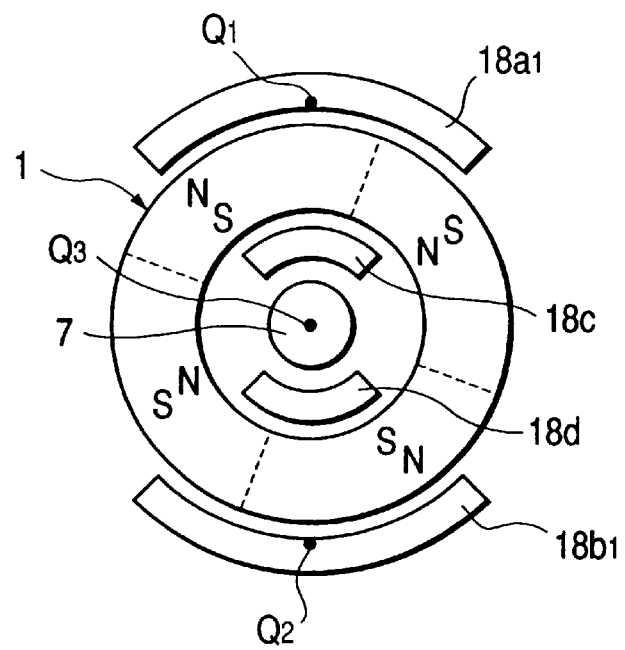
FIG. 9 shows the positional relation between the rotor and stator of the motor shown in FIG. 8, and shows the state of the rotor when a coil is not electrically energized.
Figure 10:
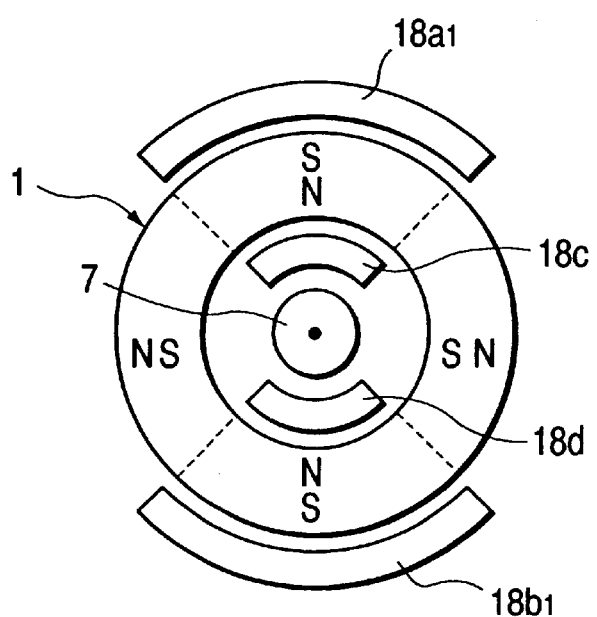
FIG. 10 shows the state of the rotor when the coil has been electrically energized from the state of FIG. 9.
Figure 11:
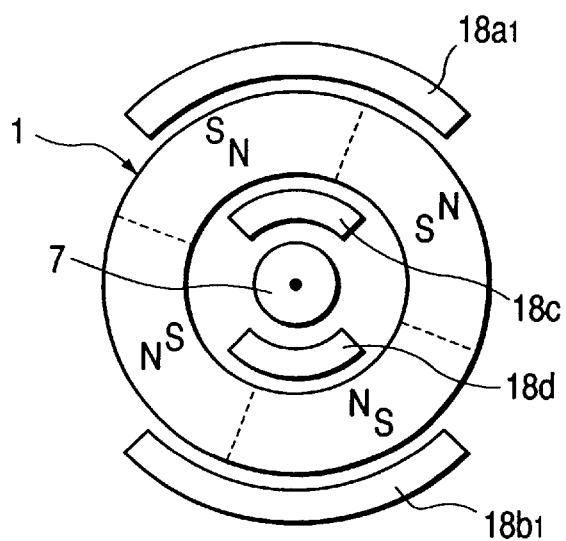
FIG. 11 shows the state of the rotor when the electrical energization of the coil has been cut off in the state of FIG. 10.

The rotor magnet 1, as shown in FIG. 7, is made to differ in magnetization phase between a portion E opposed to the portions $18a_1$ and $18b_1$ of the outer magnetic poles 18a and 18b and a portion D opposed to the extended portions $18a_2$ and $18b_2$. Thereby, as shown in FIG. 9, when the coil 2 is not electrically energized, the portion E of the magnet 1 is held at a position deviating from a straight line linking the centers of the magnetized portions $18a_1$ and $18b_1$ of the outer magnetic poles 18a and 18b magnetized by the coil 2 and the center of rotation $Q_3$ of the magnet 1 together. On the other hand, the extended portions $18a_2$ and $18b_2$ are not opposed to the inner magnetic poles 18c and 18d and therefore, are hardly magnetized as compared with the magnetized portions $18a_1$ and $18b_1$ even if the coil 2 is electrically energized, and do not produce a driving force. Accordingly, the magnetic flux created from the coil 2 by the electrical energization of the coil 2 substantially passes through the magnetized portions $18a_1$, $18b_1$ and the inner magnetic poles 18c, 18d and therefore, a force acting on the rotor magnet 1 does not go toward the center of rotation of the rotor magnet. Therefore, the motor can be actuated stably and smoothly.

The extended portions $18a_2$ and $18b_2$ are hardly magnetized as compared with the magnetized portions $18a_1$ and $18b_1$ even if the coil 2 is electrically energized, and hardly affect the driving force created by the electrical energization of the coil 2. Therefore, a sufficient and stable output can be taken out of the motor. In this Embodiment 2, the holding means for holding the magnet 1 at a position at which the centers of the poles of the magnet 1 deviate from a straight line linking the centers of the outer magnetic poles 18a and 18b and the center of rotation $Q_3$ of the magnet 1 together is constituted by the magnet 1 and the extended portions $18a_2$ and $18b_2$ opposed to the outer peripheral surface of the magnet 1. These extended portions $18a_2$ and $18b_2$ correspond to the aforedescribed positioning stators 21 and 22, and form positioning stators formed integrally with the outer magnetic poles 18a and 18b.

The operation of the motor (step motor) according to this Embodiment 2 will now be described with reference to FIGS. 9 to 12. When from the state of FIG. 9, the coil 2 is electrically energized to thereby excite the outer magnetic poles 18a and 18b of the stator 18 into N poles and the inner magnetic poles 18c and 18d of the stator 18 into S poles, the magnet 1 which is the rotor is rotated in a counter-clockwise direction as viewed in FIG. 9 and assumes a state shown in FIG. 10. The extended portions $18a_2$ and $18b_2$ corresponding to the aforedescribed positioning stators 21 and 22 are hardly excited by the coil 2 and therefore, the position of the magnet 1 is determined substantially by the excited states of the magnetized portions of the magnet 1 and the outer magnetic poles 18a, 18b and inner magnetic poles 18c, 18d of the stator 18 by the coil 2 and the magnet assumes a position shown in FIG. 10. When from this state, the electrical energization of the coil 2 is cut off, the state of FIG. 11, which is a state stabilized by the magnetic force of the magnet 1, is brought about.

Figure 12:
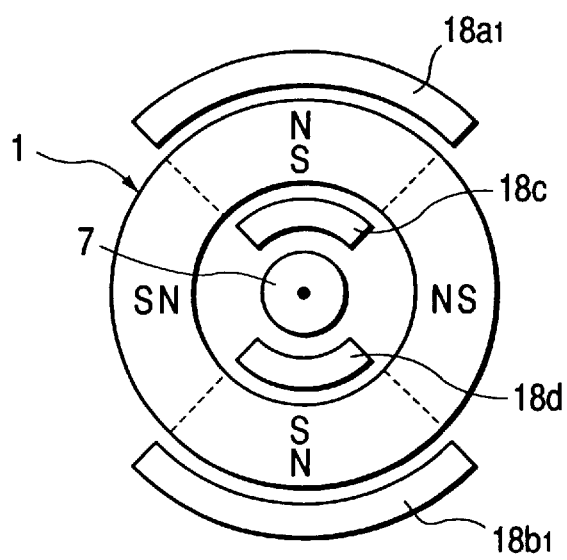
FIG. 12 shows the state of the rotor when the electrical energization of the coil has been reversed in the state of FIG. 11.

Next, when the electrical energization of the coil 2 is reversed to thereby excite the outer magnetic poles 18a and 18b of the stator 18 into S poles and the inner magnetic poles 18c and 18d of the stator 18 into N poles, the magnet 1, which is the rotor further rotated in the counter-clockwise direction, and assumes a state shown in FIG. 12. Thereafter, by sequentially changing over the direction of electrical energization of the coil 2, the magnet 1, which is the rotor is rotated to a position conforming to the phase of electrical energization. That is, the motor is rotated. When the electrical energization of the coil 2 is cut off from the state in which the motor is rotated, the motor is stopped at the position of FIG. 9, which is a state stabilized by the magnetic force of the rotor magnet 1.

Embodiment 2 of FIGS. 7 to 12 differs in the above-described points from Embodiment 1 of FIGS. 1 to 6. Thus, according to Embodiment 2 of FIGS. 7 to 12, an effect similar to that of Embodiment 1 of FIGS. 1 to 6 is obtained and in addition, the following effects can be achieved. According to Embodiment 2 of FIGS. 7 to 12, the holding means is constituted by the extended portions $18a_2$ and $18b_2$ formed integrally with the outer magnetic poles of the stator 18 and the magnet 1 and therefore, the number of parts becomes smaller and assembly becomes easy, and cost can also be reduced. Also, as in the aforedescribed Embodiment 1, the diameter of this step motor can be a sufficient size to oppose the magnetic poles of the stator 18 to the outer peripheral surface of the magnet 1, and the length of the motor can be the length of the magnet 1 plus the length of the coil 2. Thus, the size of the motor is determined by the diameters and lengths of the magnet 1 and the coil 2, and by making the diameters and lengths of the magnet 1 and the coil 2 very small, the motor can be made super-compact.

If at this time, the diameters and lengths of the magnet 1 and the coil 2 are made very small, it becomes difficult to maintain the accuracy of the step motor, but the problem of the accuracy of the step motor can be solved by simple structure in which the magnet 1 is formed into a hollow cylindrical shape and the outer magnetic poles 18a, 18b and inner magnetic poles 18c, 18d of the stator 18 are opposed to the outer peripheral surface and inner peripheral surface, respectively, of the magnet 1 formed into the hollow cylindrical shape. If in that case, not only the outer peripheral surface of the magnet 1, but also the inner peripheral surface of the magnet is circumferentially divided into a plurality of sections and magnetized, the output of the motor can be further enhanced.

Embodiment 3 of the present invention will now be described with reference to FIGS. 13 to 21, and the same portions as those of Embodiment 1 are given the same reference characters and need not be described specifically.

Figure 13:
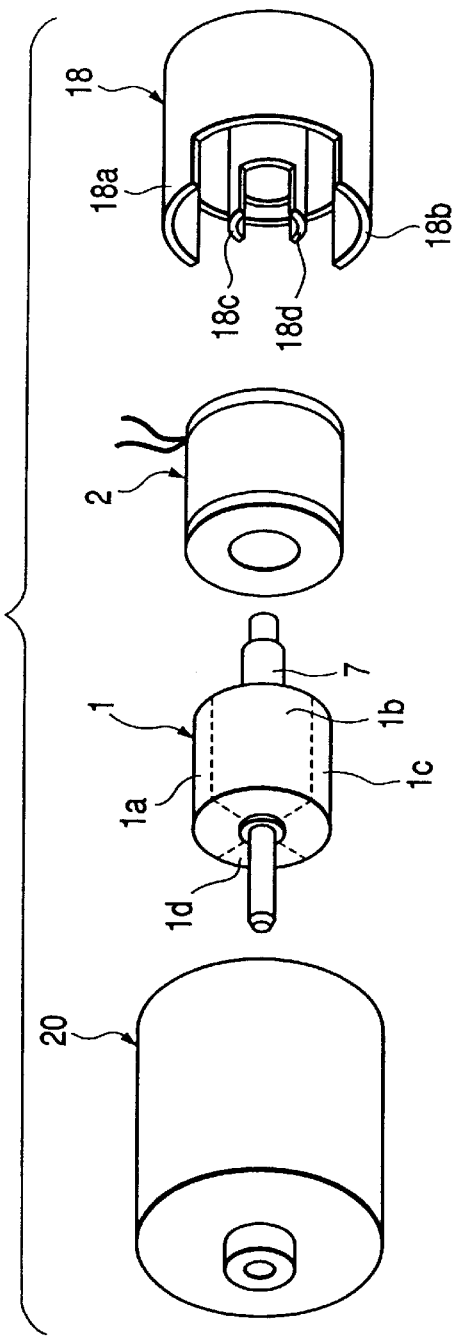
FIG. 13 is an exploded perspective view of a motor according to Embodiment 3 of the present invention.
Figure 14:
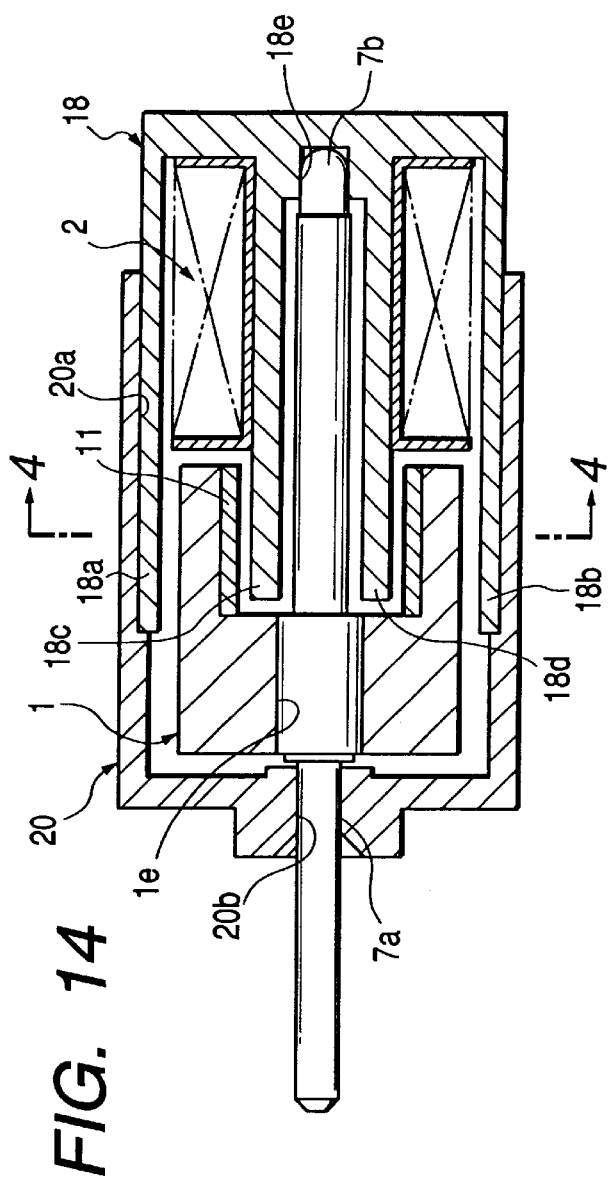
FIG. 14 is a cross-sectional view of the motor shown in FIG. 13 during the assembly thereof.
Figure 15:
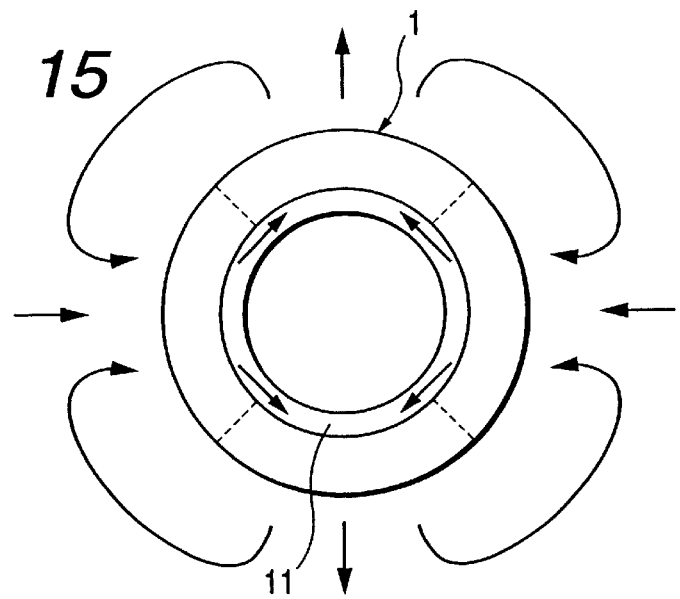
FIG. 15 is a cross-sectional view showing the state of the magnetic flux of a magnet shown in FIG. 14.

FIG. 13 is an exploded perspective view of a motor according to Embodiment 3 of the present invention, and FIG. 14 is a cross-sectional view of the motor shown in FIG. 13 during the assembly thereof. In FIGS. 13 and 14, a cylinder member 11 formed of a soft magnetic material is secured to the inner peripheral surface of the rotor magnet 1, the coil 2 is disposed axially of the rotor magnet 1, the outer magnetic poles 18a and 18b of the stator 18 excited by the coil 2 are opposed to the outer peripheral surface of the magnet 1, and the inner magnetic poles 18c and 18d of the stator 18 are opposed to the inner peripheral surface of the cylinder member 11. The cylinder member 11 is formed of a soft magnetic material, such as electromagnetic soft iron or pure iron. Therefore, it never happens that the magnetic flux of the magnet 1 leaks to the inner diametral portion of the cylinder member 11. FIG. 15 shows the state of the magnetic flux of the magnet 1 to which the cylinder member 11 is secured.

Figure 16:
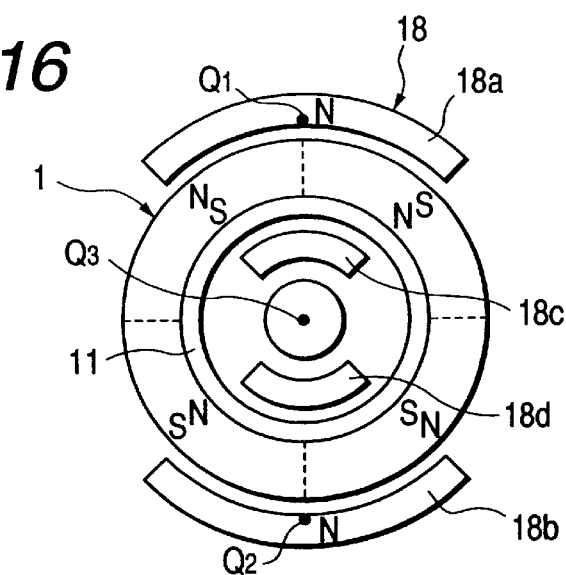
FIG. 16 shows the positional relation between the rotor and stator of the motor shown in FIG. 14, and shows the state of the rotor when a coil is not electrically energized.
Figure 17:
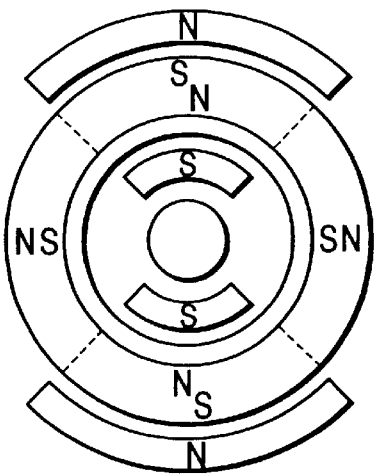
FIG. 17 shows the intermediate state of the rotor when the coil is electrically energized from the state of FIG. 16.

FIGS. 16 to 21 are illustrations sequentially showing the operation of the motor of FIGS. 13 to 15 by the use of a cross-sectional view taken along the line 4—4 of FIG. 14. In FIGS. 16 to 21, $Q_1$ designates the center of the outer magnetic pole 18a of the stator 18, $Q_2$ denotes the center of the outer magnetic pole 18b of the stator 18, and $Q_3$ designates the center of rotation of the rotor magnet 1. In FIGS. 13 to 21, the cylinder member 11 formed of a soft magnetic material is secured to the inner diametral portion of the rotor magnet 1 and therefore, it never happens that the magnetic flux of the rotor magnet 1 leaks to the inner diametral portion of the cylinder member 11 and the inner magnetic poles 18c and 18d. Therefore, the stopped position of the rotor magnet 1 during the non-energization of the coil 2, as shown in FIG. 16, is a position at which the center of each pole of the magnetized portion deviates from a straight line linking the centers $Q_1$ and $Q_2$ of the outer magnetic poles 18a and 18b of the stator 18 and the center of rotation $Q_3$ of the magnet 1 together. When from this position, the coil 2 is electrically energized, the force with which the excited outer magnetic poles 18a and 18b act on the magnetized portion of the magnet 1 turns to the direction of rotation of the magnet 1 without fail. Therefore, the magnet (rotor magnet) 1 is actuated smoothly.

In a motor that is not provided with the cylinder member 11, the position at which the magnet 1 is stably stopped when the coil 2 is not electrically energized is a position shown in FIG. 22 or a position shown in FIG. 23. FIGS. 22 and 23 are typical cross-sectional views showing those two positions. Accordingly, if the step motor described with reference to FIGS. 13 to 21 is not provided with the cylinder member 11, the position at which the magnet 1 is stably stopped when the coil 2 is not electrically energized is the position shown in FIG. 22 or 23. If the magnet 1 is stably stopped as shown in FIG. 22, the centers of the magnetic poles of the magnetized portion are on a straight line linking the center $Q_1$ of the outer magnetic poles and the center of rotation $Q_3$ of the magnet 1 together and therefore, even if the coil 2 is electrically energized, an electromagnetic force does not act in a direction to rotate the magnet 1 and therefore, the magnet cannot be actuated.

Figure 18:
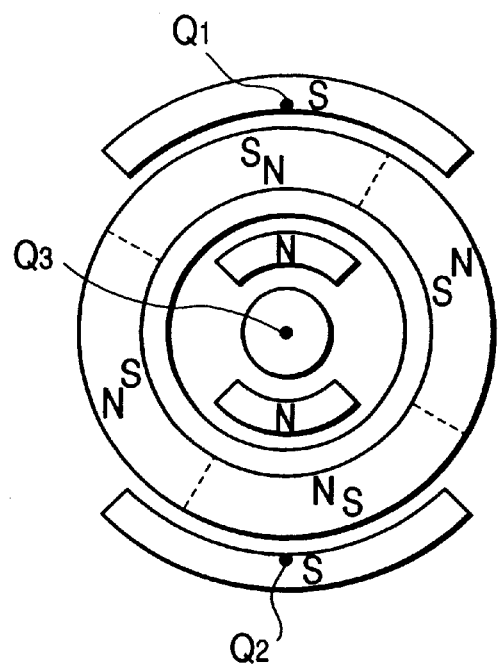
FIG. 18 shows the final state of the rotor when the coil is electrically energized from the state of FIG. 16.

The operation of the step motor according to Embodiment 3 of the present invention described in connection with FIGS. 13 to 15 will now be described with reference to FIGS. 16 to 21. When from the state of FIG. 16, the coil 2 is electrically energized to thereby excite the outer magnetic poles 18a and 18b of the stator 18 into N poles and the inner magnetic poles 18c and 18d of the stator 18 into S poles, the magnet 1 which is the rotor is rotated by 45° in a counter-clockwise direction as viewed in FIG. 16 and assumes a state shown in FIG. 17, and is further rotated to a position shown in FIG. 18 by inertia. In the state of FIG. 18, the centers of the poles of the magnetized portion are not on the straight line linking the centers of the outer magnetic poles and the center of rotation of the magnet 1 together and therefore, the electrical energization of the coil 2 is changed over at the timing of FIG. 18 to thereby excite the outer magnetic poles 18a and 18b of the stator 18 into S poles and the inner magnetic poles 18c and 18d of the stator 18 into N poles, whereby the rotor magnet 1 receives a rotatively driving force and is rotated.

Figure 19:
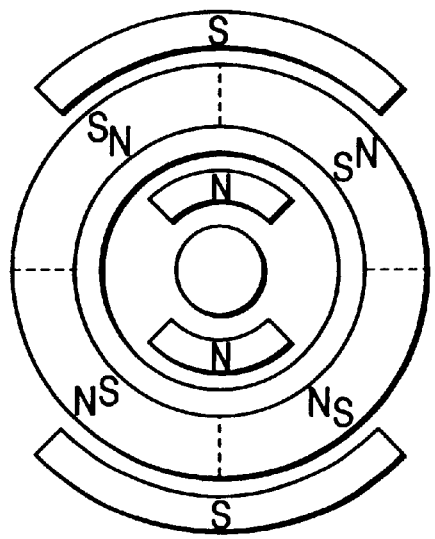
FIG. 19 shows a first intermediate state of the rotor when the electrical energization of the coil has been reversed in the state of FIG. 18.
Figure 20:
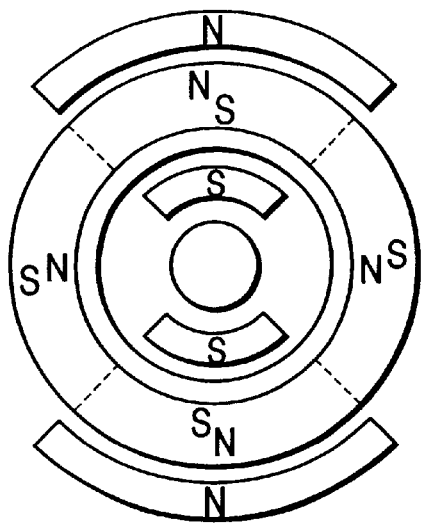
FIG. 20 shows a second intermediate state of the rotor when the electrical energization of the coil has been reversed in the state of FIG. 18.
Figure 21:
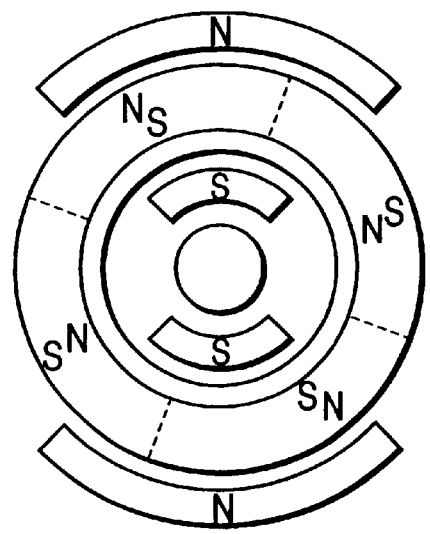
FIG. 21 shows the final state of the rotor when the electrical energization of the coil has been reversed in the state of FIG. 18.

Thereby, the magnet 1 passes the state of FIG. 19 and is further rotated in the counter-clockwise direction, and momentarily passes the stable state in the electrically energized state shown in FIG. 20, and is further rotated by inertia and rotated to a position shown in FIG. 21. In the state of FIG. 21, the centers of the poles of the magnetized portion are not on the straight line linking the centers of the outer magnetic poles and the center of rotation of the magnet 1 together and therefore, the electrical energization of the coil 2 is changed over at the timing of FIG. 21 to thereby excite the outer magnetic poles 18a and 18b of the stator 18 into N poles and the inner magnetic poles 18c and 18d of the stator 18 into S poles, whereby the rotor magnet 1 receives a rotatively driving force and is rotated. Thereafter, the electrical energization as described in connection with FIGS. 16 to 21 is repetitively effected, whereby the rotor magnet 1 is rotated. That is, the motor is rotated. When the electrical energization of the coil 2 is cut off from the state in which the motor is rotated, there is brought about the stable state of FIG. 16 or 19 which is a state in which the motor is stabilized by the magnetic force of the rotor magnet 1. In this state, as previously described, when the coil 2 is electrically energized, the electromagnetic force acts in a direction to rotate the magnet 1 and therefore, the magnet can be smoothly actuated when it is to be actuated again.

According to Embodiment 3 described above, the diameter of the motor is substantially determined by the outer magnetic poles 18a and 18b opposed to the outer peripheral surface of the rotor magnet 1, and the axial length of the motor is determined by axially arranging (disposing) the coil 2 and the rotor magnet 1, and the motor can be made very compact. Also, a magnetic flux created by the coil 2 crosses the magnet between the outer magnetic poles and the inner magnetic poles and therefore, effectively acts. Further, the cylinder member 11 prevents a magnetic flux created from the inner diametral portion of the rotor magnet 1 from going round to the inner magnetic poles 18c and 18d, and during the non-energization of the coil 2, it holds the rotor magnet 1 at a position deviating from the straight line linking the centers of the outer magnetic poles and the center of rotation of the magnet together and therefore, during the stoppage of the motor to the first electrical energization of the coil 2, the force with which the magnetic flux created from the coil 2 acts on the magnet does not go toward the center of rotation of the magnet and accordingly, it becomes possible to effect the starting of smooth and stable rotation.

Also, the motor can be constructed of a very small number of parts such as the rotor magnet 1, the coil 2, the stator 18, the output shaft 7 and the cylinder member 11 and thus, the cost can be made low. Also, the rotor magnet 1 is formed into a hollow cylindrical shape, and the outer magnetic poles 18a, 18b and the inner magnetic poles 18c, 18d are opposed to the outer peripheral surface and inner peripheral surface, respectively, of the rotor magnet 1 formed into the hollow cylindrical shape, whereby an effective output can be obtained as a motor. The output shaft (rotor shaft 7) is secured to the fitting portion 1e of the central hole of the magnet 1 which is the rotor by a press-in operation. The rotor magnet 1 comprises a plastic magnet formed by injection molding and therefore, the rotor magnet 1 is not broken even by the assembly by a press-in operation, and even a complicated shape in which the fitting portion 1e of a small inner diameter is provided in the axially central portion can be manufactured easily. Also, the output shaft 7 and the magnet 1 are assembled and secured by a press-in operation and therefore, the assembly is easy and easy manufacture becomes possible.

It will now be described in detail that the step motor of the construction described above in Embodiment 3 is of a construction best suited for making the motor super-compact. That is, in the basic construction of the step motor, firstly, the rotor magnet 1 is made into a hollow cylindrical shape, secondly, the outer peripheral surface of the rotor magnet 1 is circumferentially divided into a plurality and alternately magnetized to different poles, thirdly, the coil 2 is disposed axially of the rotor magnet 1, that fourthly, the outer magnetic poles and inner magnetic poles of the stator 18 excited by the coil 2 are opposed to the outer peripheral surface and inner peripheral surface, respectively, of the rotor magnet 1, fifthly, the outer magnetic poles 18a and 18b are formed by cut-away apertures and teeth extending in parallelism to the shaft, and sixthly, the cylinder member 11 formed of a soft magnetic material is secured to the inner diametral portion of the rotor magnet 1.

The diameter of this step motor (motor) can be a sufficient size to oppose the magnetic poles of the stator 18 to the diameter of the rotor magnet 1, and the length of this step motor can be the length of the rotor magnet 1 plus the length of the coil 2. Thus, the size of the step motor is determined by the diameters and lengths of the rotor magnet 1 and the coil 2, and if the diameters and lengths of the rotor magnet 1 and the coil 2 are made very small, the step motor can be made super-compact.

If at this time, the diameters and lengths of the rotor magnet 1 and the coil 2 are made very small, it will become difficult to maintain the accuracy as the step motor, but in the aforedescribed embodiment, the problem of the accuracy of the step motor is solved by a simple construction in which the rotor magnet is formed into a hollow cylindrical shape and the outer magnetic poles and inner magnetic poles of the stator 18 are opposed to the outer peripheral surface and inner peripheral surface, respectively, of the rotor magnet 1 formed into the hollow cylindrical shape. If in that case, not only the outer peripheral surface of the rotor magnet 1, but also the inner peripheral surface of the rotor magnet 1 is circumferentially divided into a plurality and magnetized, the output of the motor can be further enhanced.

Also, the magnetic flux of the rotor magnet 1 can be prevented from leaking to the inner diametral portion of the cylinder member 11 and the inner magnetic poles 18c and 18d by the cylinder member 11. Therefore, the stopped position of the magnet 1 when the coil 2 is not electrically energized is set to a position at which the center of each pole of the magnetized portion of the magnet deviates from a straight line linking the centers $Q_1$ and $Q_2$ of the outer magnetic poles 18a and 18b of the stator 18 and the center of rotation $Q_3$ of the magnet 1 together, as shown in FIG. 16. When from this position (deviated position), the coil 2 is electrically energized, the force with which the excited outer magnetic poles 18a and 18b act on the magnetized portion of the magnet 1 turns to the direction of rotation of the magnet 1. Therefore, the magnet 1 is actuated smoothly.

Also, the rotor magnet 1, as previously described, is formed of a plastic magnet material formed by injection molding, whereby the thickness thereof with respect to the diametral direction of the cylindrical shape can be made very small. Therefore, the distance between the outer magnetic poles 18a, 18b and inner magnetic poles 18c, 18d of the stator 18 can be made very small, and the magnetic resistance of a magnetic circuit formed by the coil 2 and the stator 18 can be made small. Thereby, a great deal of magnetic flux can be created by a small electric current, and it becomes possible to achieve the increased output and lower power consumption of the motor and the downsizing of the coil.

Further, the mechanical strength of the magnet 1 can be increased by the cylinder member 11 and accordingly, the magnet 1 can be made thinner. If the magnet 1 is made thinner, the gap between the outer magnetic poles and inner magnetic poles of the stator 18 can be made narrow and correspondingly, magnetic resistance can be reduced. Thereby, it becomes possible to drive the magnet by a small electric current.

In each of the above-described embodiments, the outer peripheral surface of the magnet is circumferentially divided into n, which are alternately magnetized to S poles and N poles, and the inner peripheral surface of the magnet is also circumferentially divided into n section, which are alternately magnetized to S poles and N poles so as to differ from the adjacent outer peripheral surface, but only the outer peripheral surface of the magnet may be circumferentially divided into n section, which may be alternately magnetized to S poles and N poles.

As is apparent from the above description, according to the present invention, the motor is of a construction which is provided with a rotatable rotor magnet circumferentially alternately magnetized to different poles, a cylindrical stator opposed to the rotor magnet with a clearance therebetween, and a coil mounted in the interior of the stator, and in which the coil is disposed axially of said rotor magnet, the outer magnetic poles of the stator excited by said coil are opposed to the outer peripheral surface of the magnet, the inner magnetic poles of said stator are opposed to the inner peripheral surface of the magnet, and provision is made of holding means for holding the magnet at a position at which the centers of the poles of the magnet deviate from a straight line linking the centers of the outer magnetic poles and the center of rotation of the magnet together, and therefore the diameter of the motor can be of a size enough to oppose the magnetic poles of the stator to the diameter of the rotor magnet, and the length of the motor can be the length of the rotor magnet plus the length of the coil and thus, the diameters and lengths of the rotor magnet and the coil can be made very small to thereby make the motor super-compact, and by providing the holding means, the stopped position of the rotor magnet when said coil is not electrically energized is a position at which the center of each pole of the magnetized portion of the rotor magnet deviates from the straight line linking the centers of the outer magnetic poles and the center of rotation of the rotor magnet together, and from this position, the coil is electrically energized, whereby the force with which the excited outer magnetic poles act on the magnetized portion of the rotor magnet turns to the direction of rotation of the rotor magnet without fail, whereby it becomes possible to actuate the rotor magnet smoothly.

Also, according to the present invention, there is provided a motor which is provided with a rotatable rotor magnet circumferentially alternately magnetized to different poles, a cylindrical stator opposed to the rotor magnet with a clearance therebetween, and a coil mounted in the interior of the stator, and in which a cylinder member formed of a soft magnetic material is secured to the inner diametral portion of said rotor magnet, the coil is disposed axially of said rotor magnet, the outer magnetic poles of the stator excited by the coil are opposed to the outer peripheral surface of the magnet, and the inner magnetic poles of the stator are opposed to the inner peripheral surface of the cylinder member, and therefore the diameter of the motor can be a size enough to oppose the magnetic poles of the stator to the diameter of said rotor magnet, and the length of the motor can be the length of the rotor magnet plus the length of said coil and therefore, the diameters and lengths of the rotor magnet and the coil can be made very small to thereby make the motor super-compact, and the magnetic flux of the rotor magnet can be provided from leaking to the inner diametral portion of the cylinder member and the inner magnetic poles of the stator by said cylinder member, whereby the stopped position of the rotor magnet when the coil is not electrically energized is a position at which the center of each pole of the magnetized portion of the rotor magnet deviates from a straight line linking the centers of the outer magnetic poles and the center of rotation of the rotor magnet together, and from this position, the coil is electrically energized, whereby the force with which the excited outer magnetic poles act on the magnetized portion of the rotor magnet turns to the direction of rotation of the rotor magnet, whereby the rotor magnet can be actuated smoothly.

Also, according to the present invention, the outer and inner magnetic poles together form a state and the holding means has a positioning stator provided adjacent to the outer magnetic poles of the stator.

What is claimed is:

1. A motor comprising:
    a magnet formed into a cylindrical shape and having at least an outer peripheral surface circumferentially alternately magnetized to different poles;
    a coil provided axially of said magnet, said coil being provided with substantially the same dimension as that of an outer diameter, in the radial direction, of said magnet;
    outer magnetic poles excited by said coil, said outer magnetic poles being opposed to the outer peripheral surface of said magnet;
    inner magnetic poles excited by said coil, said inner magnetic poles being opposed to the inner peripheral surface of said magnet, said coil being provided between said inner magnetic poles and said outer magnetic poles; and
    holding means for holding said magnet at a position at which centers of the poles of said magnet deviate from a straight line linking centers of said outer magnetic poles and a center of rotation of said magnet together when said outer magnetic poles and said inner magnetic poles are not excited by said coil, said holding means comprising a member having a soft magnetic material.

2. A motor according to claim 1, wherein said outer magnetic poles and said inner magnetic poles together form a stator, and said member having a soft magnetic material is a positioning stator which is provided adjacent to said outer magnet poles.

3. A motor according to claim 2, wherein the outer magnetic poles of said stator are fixed to an inner side of a cylindrical cover, and a rotary shaft fixed to said magnet is taken out of said cover.

4. A motor according to claim 3, wherein said positioning stator is fixed to the inner side of said cover so as not to contact with the outer magnetic poles of said stator.

5. A motor according to claim 1, wherein said magnet has an inner peripheral surface circumferentially alternately magnetized to different poles and also magnetized to poles differing from adjacent poles on the outer peripheral surface.

6. A motor according to claim 1, wherein said member having a soft magnetic material is a cylindrical member provided on an inner surface of said magnet.

7. A motor according to claim 1, wherein said magnet has magnetized layer having an outer peripheral surface circumferentially alternately magnetized to different poles, and another magnetized layer out of phase with said magnetized layer and having at least the outer peripheral surface circumferentially alternately magnetized to different poles, and said member having a soft magnetic material is an extension extending from said outer magnetic poles and opposite from an outer surface of said another magnetized layer of said magnet.

8. A motor comprising:
    a rotatable rotor magnet circumferentially alternately magnetized to different poles;
    a cylindrical stator opposed to said rotor magnet with a clearance therebetween and having outer magnetic poles and inner magnetic poles;
    a coil mounted in an interior of said stator;
    holding means comprising a positioning stator having a soft magnetic material provided adjacent to said outer magnetic material provided adjacent to said outer magnetic poles, wherein said coil is provided axially of said magnet between said inner magnetic poles and said outer magnetic poles and provided with substantially the same dimension as that of an outer diameter of said magnet, wherein the outer magnetic poles are excited by said coil and opposed to an outer peripheral surface of said magnet, the inner magnetic poles are opposed to an inner peripheral surface of said magnet, and wherein said holding means holds said magnet at a position at which centers of the poles of said magnet magnetic poles and a center of rotation of said magnet together.

9. A motor comprising:
    a magnet formed into a cylindrical shape, said magnet having a first magnetized layer having at least an outer peripheral surface thereof circumferentially alternately magnetized to different poles, and a second magnetized layer having at least an outer peripheral surface thereof circumferentially alternately magnetized to different poles;

a coil provided axially of said magnet, said coil being provided with substantially the same dimension as that of an outer diameter of said magnet;

outer magnetic poles excited by said coil, said outer magnetic poles being opposed to an outer peripheral surface of the first magnetized layer of said magnet;

inner magnetic poles excited by said coil, said inner magnetic poles being opposed to an inner peripheral surface of the first magnetized layer of said magnet, said coil being provided between said inner magnetic poles and said outer magnetic poles; and holding means for holding said magnet at a position at which centers of the poles of said magnet deviate from a straight line linking centers of said outer magnetic poles and a center of rotation of said magnet together when said outer magnetic poles and said inner magnetic poles are not excited by said coil, said holding means having an extending-out portion extending out from said outer magnetic poles and opposed to an outer peripheral surface of the second magnetized layer of said magnet.

10. A motor comprising:

a rotatable rotor magnet circumferential alternately magnetized to different poles;

a cylindrical stator opposed to said rotor magnet with a clearance therebetween;

a coil mounted in an interior of said stator; and a cylinder member formed of a soft magnetic material and disposed in an inner diametral portion of said rotor magnet, wherein said coil is provided axially of said magnet between inner and outer magnetic poles of said stator and provided with substantially the same dimension as that of an outer diameter of said magnet, wherein the outer magnetic poles of said stator are excited by said coil and opposed to an outer peripheral surface of said magnet, and the inner magnetic poles of said stator are opposed to an inner peripheral surface of said cylinder member.

\* \* \* \* \*

UNITED STATES PATENT AND TRADEMARK OFFICE
CERTIFICATE OF CORRECTION

PATENT NO.    : 6,400,055 B1
DATED         : June 4, 2002
INVENTOR(S)   : Chikara Aoshima et al.

It is certified that error appears in the above-identified patent and that said Letters Patent is hereby corrected as shown below:

Title page,
Item [56], References Cited, FOREIGN PATENT DOCUMENTS,
"JP 10225088   8/1998" should read -- JP 10-225088    8/1998 --.
"JP 409289767  11/1997" should read -- JP 4-289767    11/1997--.

Column 4,
Line 15, "magnet" should read -- magnetic --.
Lines 41 and 43, "bending" should read -- binding --.

Column 6,
Line 10, "designate" should read -- designates --.

Column 7,
Lines 18, 34 and 38, "rotor" should read -- rotor, --.

Column 8,
Line 1, "magnet 1," should read -- magnet 1 --.
Line 18, "magnet 1" should read -- magnet 1, --.

Column 9,
Line 51, "18a," should read -- 18a, --.

Column 10,
Line 43, "rotor further" should read -- rotor, is further --.
Line 46, "rotor" should read -- rotor, --.

Column 13,
Line 43, "that" should be deleted.

Column 14,
Line 47, "n," should read -- n sections, --.
Lines 49 and 53, "section," should read -- sections, --.
Lines 62, 63 and 65, "said" should read -- the --.

Column 15,
Lines 10, 27, 34, 35 and 41, "said" should read -- the --.

Column 16,
Line 62, "magnetic" should read -- deviate from a straight line linking centers of said outer magnetic --.

UNITED STATES PATENT AND TRADEMARK OFFICE
CERTIFICATE OF CORRECTION

PATENT NO. : 6,400,055 B1
DATED : June 4, 2002
INVENTOR(S) : Chikara Aoshima et al.

It is certified that error appears in the above-identified patent and that said Letters Patent is hereby corrected as shown below:

Column 51,
Line 2, "section" should read -- sections --.

Signed and Sealed this

Twenty-second Day of April, 2003

JAMES E. ROGAN
*Director of the United States Patent and Trademark Office*